Nov. 30, 1965  G. NOGARD ETAL  3,220,813
METHOD AND APPARATUS FOR REMOVING IMPURITIES
IN MANUFACTURE OF GLASS
Filed March 8, 1962  5 Sheets-Sheet 1

INVENTORS
GEORGES NOGARD
ROSINO URBAN
BY
Bauer and Seymour
ATTORNEYS

Nov. 30, 1965   G. NOGARD ETAL   3,220,813
METHOD AND APPARATUS FOR REMOVING IMPURITIES
IN MANUFACTURE OF GLASS
Filed March 8, 1962   5 Sheets-Sheet 2

Fig. 2

INVENTORS
GEORGES NOGARD
ROSINO URBAN
BY
Bauer and Seymour
ATTORNEYS

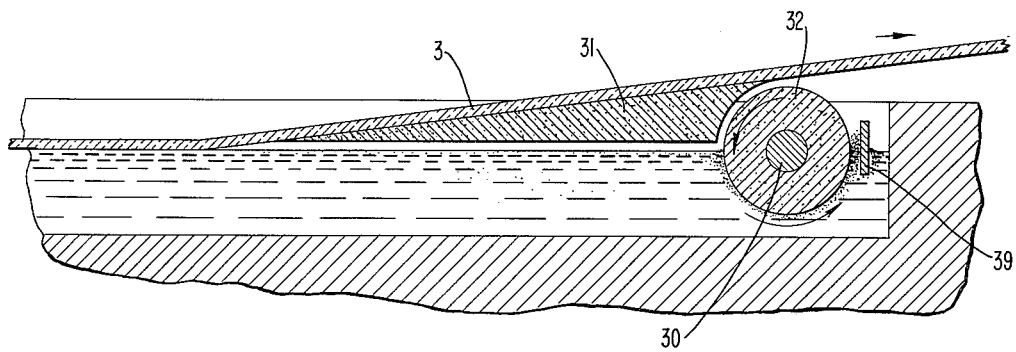
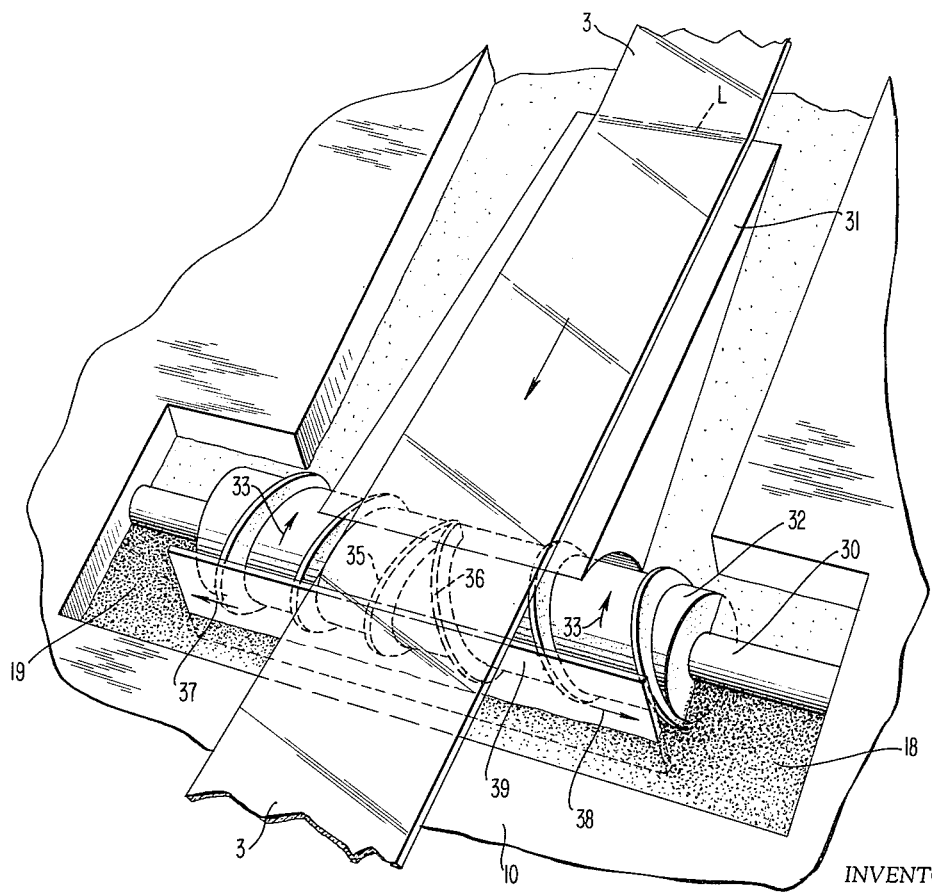

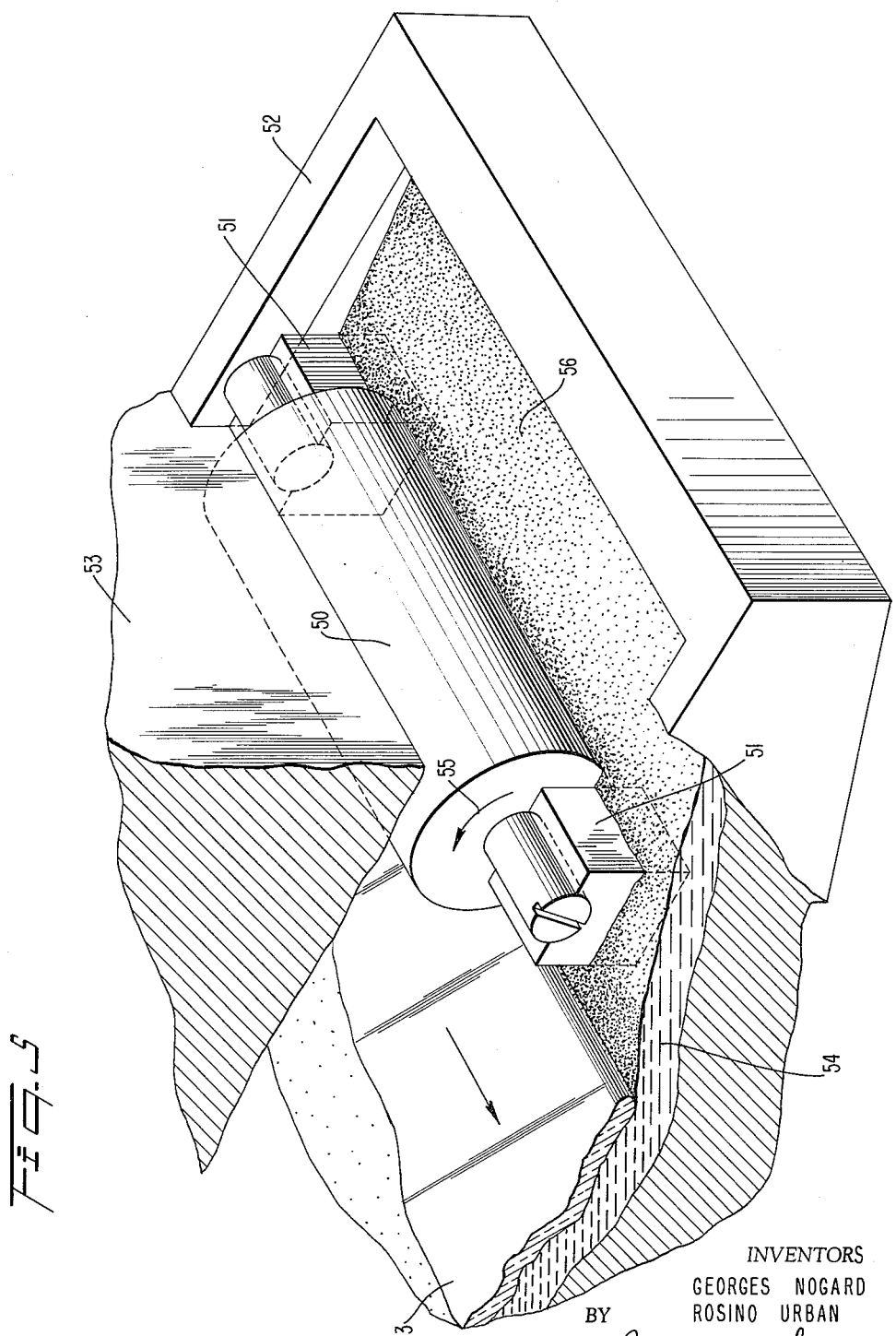

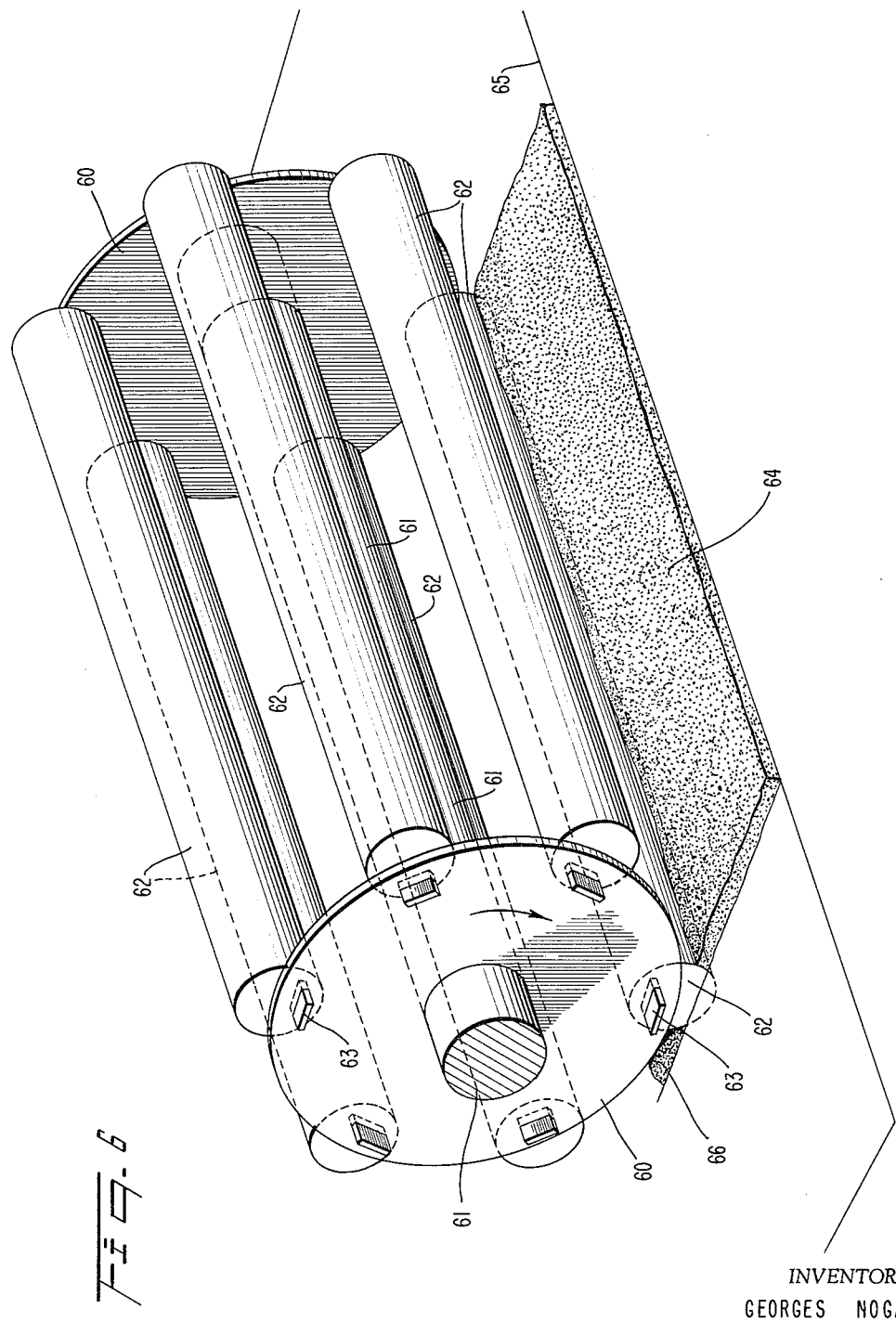

United States Patent Office 3,220,813
Patented Nov. 30, 1965

3,220,813
METHOD AND APPARATUS FOR REMOVING
IMPURITIES IN MANUFACTURE OF GLASS
Georges Nogard, Paris, and Rosino Urban, Fontainebleau, Seine-et-Marne, France, assignors to Compagnie de Saint-Gobain, Neuilly-sur-Seine, France
Filed Mar. 8, 1962, Ser. No. 178,326
Claims priority, application France, Mar. 13, 1961, 855,420, Patent 1,291,605
7 Claims. (Cl. 65—27)

This application claims priority of the French applications, Serial Nos. 855,420 and 889,746, filed March 13, 1961 and March 2, 1962, respectively.

This invention relates to an apparatus and to a process which removes floating impurities from the surface of a metal bath. The invention is particularly useful in removing floating metallic oxides from the metallic baths which are used in the glass industry to support a newly formed sheet of glass. These baths are usually tin or tin alloy, upon the surface of which oxides form and float, when the bath is in contact with an oxidizing gas such as air, sometimes as individual crystals and sometimes as a pellicle. These oxide impurities cause imperfections in the surface of the sheet of glass and it is necessary to remove them from a position near the sheet to areas of the bath remote from the sheet and from which they can be skimmed. The description of the invention will be in connection with the solution of this particular problem of the glass industry.

The floating impurities appear on the tin bath usually in those parts which have the lowest temperature because the oxides of the metal used as the liquid of the bath are not eliminated by volatilization at such temperatures. This is particularly true for that part of the bath which is most remote from the point of admittance and from which location the glass, having been markedly cooled, is removed from contact with the bath.

It is an object of the invention to remove floating imperfections from the surface of a molten metal bath and to transport them from the regions of the bath where their presence is particularly harmful to regions where their presence is unimportant or from which they can readily be removed.

The objects of the invention are accomplished, generally speaking, by the method of removing finely divided impurities from a molten metal which comprises entraining the impurities on a moving surface which is partly immersed in the bath, conducting the impurities through the bath to the surface of a part of the bath which is separated from the rest of the bath, and removing the impurities from the bath.

The apparatus which also constitutes a novel part of the invention is essentially constituted of one or several elements composed of a material which is not wetted by the metal of the bath, such as graphite partially immersed in the bath, and driven in such a way that the submerged part of said element moves outwards while the part not immersed moves inwards.

During the operation of the device the impurities float progressively toward the elements, are entrained by them eventually, and are discharged on the other side. The moving surfaces may have different shapes, e.g. cylindrical or conic, or may be moving belts, but they preferably have a smooth, continuous surface, a construction which facilitates the discharge of the entrained impurities at the surface of the bath.

According to one form of the invention, this or these elements are constituted by one or a plurality of rotating cylinders which are, in those parts which are in contact with the bath, composed of a material which is resistant to the attack of molten metal and is not wetted by the molten metal.

The apparatus comprises one or several of such cylinders, placed each along a side of the tank containing the bath, partially immersed in the bath in such a way that the lower generatrix is constantly submerged during the rotation of the cylinder, the direction of the rotation being such that each generatrix moves toward the side of the tank while submerged and toward the center of the tank when not submerged.

The impurities are progressively directed toward the cylinders, are entrained by adhesion in the surface of said cylinders, are carried under the surface of the bath, and rise again to the surface between the cylinders and the sides of the bath. The submerged portion of the cylinder carries the part of the oxides layer in contact with it to another part of the surface in the vicinity of the sides where the layer separates from the cylinder by surface-tension and accumulates in an area provided for and from which it is possible to extract it.

The oxide layer remaining on the surface of the bath spreads out because of surface tension, and takes the place of the oxides previously transported and are captured by another part of the element or cylinder; as a result the removing of the oxide layer is performed continuously.

The cylinders may be provided with external helices which do not affect the function described above but serve to move the collected impurities toward a point or points of the furnace from which they can be readily removed by skimming or dipping. Refractory metal cylinders can be used in place of graphite provided they do not react with the bath or the atmosphere above it. The cylinders are mounted in bearings in the tank which contains the metal bath, for instance in graphite bearings, and are driven by ordinary driving means.

In one form of the invention a plurality of cylinders is employed to draw impurities from opposite sides of the advancing sheet. In a second form of the invention a single cylinder is mounted transversely beneath the advancing sheet at a point where the sheet has been lifted away from the bath. In another form of apparatus the rotating element may be constituted by a plurality of rods placed concentrically around a central shaft which rotate around said shaft. In yet another form provision is made for the capture of floating aggregates.

The driving of the cylinders or of the rotating elements is obtained by mechanical means giving to the elements a relatively low motion without jerks.

The above and further objects and novel features of the present invention will more fully appear from the following detailed description when the same is read in connection with the accompanying drawings. It is to be expressly understood, however, that the drawings are for the purpose of illustration only and are not intended as a definition of the limits of the invention, reference for this latter purpose being had primarily to the appended claims.

In the drawings, wherein like reference characters refer to like parts throughout the several views, FIG. 1 is a perspective view of an apparatus for the manufacture of sheet glass showing the discharge end and the mounting of a plurality of cylinders of this invention;

FIG. 2 is a plan view partly in section of one of the cylinders and its mounting in the tank;

FIG. 3 is a perspective view of a modified form of the invention in which a single cylinder is used;

FIG. 4 is a longitudinal section through the apparatus of FIG. 3;

FIG. 5 is a perspective view of a modified form of a tank particularly constructed for the application of this invention;

FIG. 6 is another form of rotating element.

Figure 1:
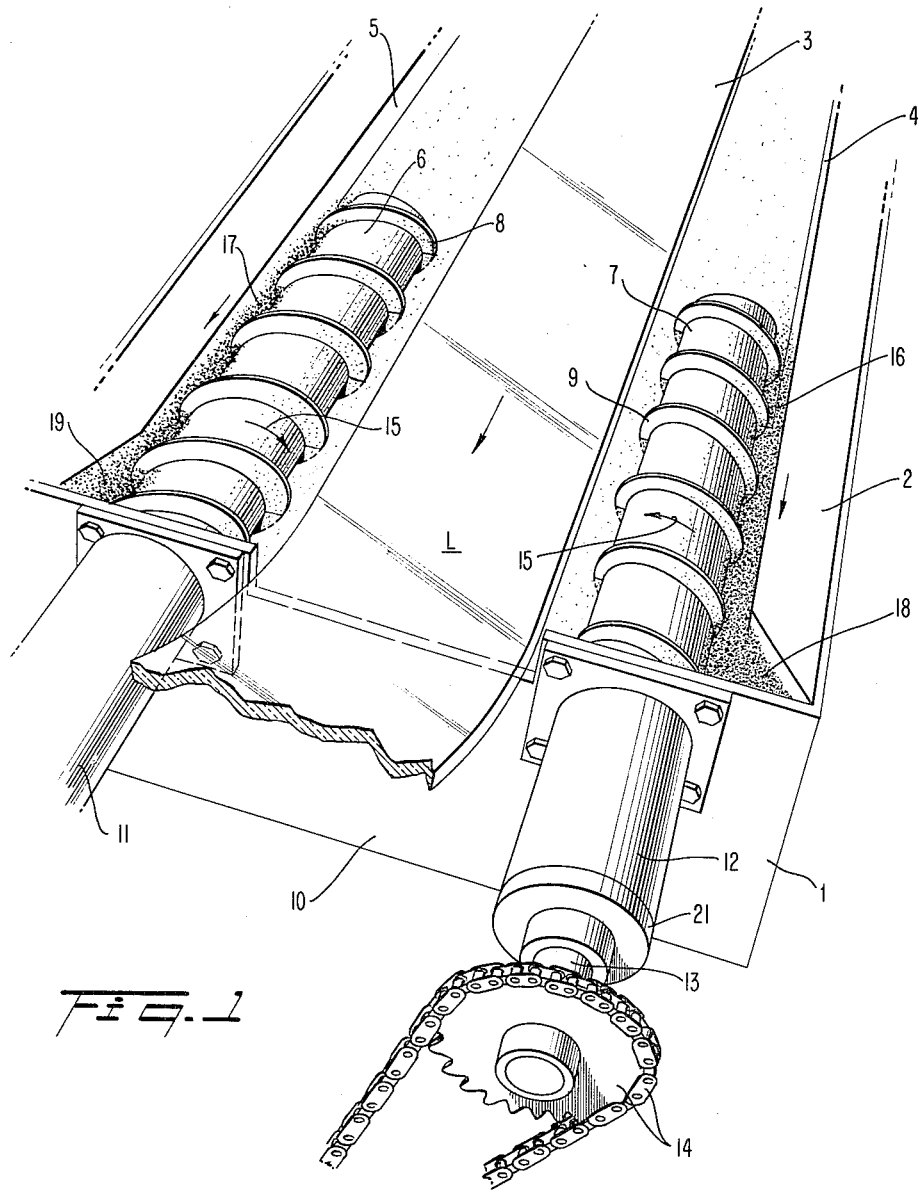

Referring now to the figures in the drawing and particularly to FIG. 1, a tank 1 contains a bath of tin 2 upon the surface of which floats a moving sheet of glass 3. The sheet of glass is lifted from the surface of the bath at a location indicated by the letter L and is drawn away from the bath for further processing.

Between the outer walls 4, 5 of the tank are mounted cylinder rollers 6, 7 which are slightly less than half submerged in the molten tin bath and are provided with external helices 8,9. The cylinders are mounted in the end wall 10 in the tank in supports 11, 12 through which shafts 13, connected to the cylinders, project to be driven by driving means such as a sprocket wheel and chain 14. The cylinders in this construction are, in those parts which engage the tin bath, preferably composed of graphite.

As the sheet 3 moves along the tin bath it is progressively cooled and in the region between the two cylinders there is a distinct formation of oxide impurities which tend to float on the surface of the bath. These impurities attach themselves to the face of the sheet or otherwise harmfully affect it. The cylinders are turned in the direction shown by the arrow 15 and as they turn they entrain the impurities which are floating near the glass sheet, carry them beneath the level of the bath and release them in the areas 16, 17 between the cylinders and the side walls of the tank. In these locations the helices 8, 9 gather them and move them to wells 18, 19 from which they can be removed.

In FIG. 2 is shown a ribbed hollow cylinder mounted on a hollow shaft 13 of stainless steel passing through a sleeve 12 and bearings 21, 22 which are mounted in the opposite ends of the sleeve. The sleeve itself is mounted in a ring 24 which is bolted about an aperture 25 to the end of the tank. The bearing 22 has a flange which overlaps the inner face of the ring 24 making a tight seal. The metal shaft 13 extends into the furnace and supports the graphite sleeve 7 which is cylindrical and to which it is secured by key means 28.

When the sprocket 14 is turned it rotates the shaft 13 and turns the graphite cylinder 7.

In FIGS. 3 and 4 are shown a modification of the invention in which a shaft 30 is mounted transversely in the tank at the end from which the glass sheet 3 is withdrawn. The sheet is taken out of contact with the bath at location L and is transported on a graphite ramp 31 to a position where it passes over the graphite roller 32 which is mounted on the shaft 30. The roller is partly submerged in the bath and entrains the floating impurities, whether solid or liquid, which form on the bath. The rotation of the cylinder which is in the direction of the arrows 33 entrains the impurities and carries them through the bath to discharge them in a space between the end wall of the tank and the cylinder itself.

The cylinder is provided with oppositely directed helices 35, 36 which move the impurities in the directions of the arrows 37, 38 to positions from which they can be readily removed. In the form of the invention which is shown in the drawings a board 39 has been interposed between the end of the tank and the roller 32.

In FIG. 5 is shown the construction of a tank which has been particularly designed for the operation of this invention. In this form of the invention a smooth cylinder 50 is mounted in bearings 51 in a bay 52 which is constructed outside the side wall 53 of the tank. The cylinder 50 rotates in an aperture in the wall of the tank beneath the section 53. The sheet of glass 3 moves along the tank in the direction of the arrow on the surface of the metallic bath 54. The cylinder 50 is turned in the direction of the arrow 55 by means not shown and entrains the impurities floating near the glass, discharging them at 56 in the bay 52. This bay in its construction is quite similar to the dog houses in glass furnace construction. It has been observed that the rotation of this roller not only entrains the impurities which are close to it but sets up a flow of impurities from all parts of the bath toward the roller.

In FIG. 6 is shown a form of the invention in which the rotating member which passes through the bath to entrain the sheet of oxides which covers the bath, includes a plurality of surfaces which are successively dipped in and removed from the bath. This rotor includes a plurality of rings 60 mounted on shaft 61 and supporting a plurality of cylinders 62 which are mounted equidistant from the shaft around the periphery of the rings. The shaft may be rotated by any means. The rings are provided with elongated holes which receive similarly shaped projections 63 on the ends of cylinders 62. These cylinders are thus successively dipped in and removed from the bath, do not rotate about their own axes but undergo planetary rotation about axis 61. The number of rollers is such that at least one roller is immersed in the bath at all times.

For purposes of illustration the numeral 64 illustrates a magnified layer of oxides floating on the bath at the edge 65 of the glass and the numeral 66 indicates the accumulation of the oxides which has been drawn away through the bath by the planetary motion of the cylinders. A particular advantage of this form of the invention is that when accumulations of oxides form and float on the surface and offer some obstruction to removal by perfectly smooth surfaces such as that of FIG. 5, they will be well entrapped between successive cylinders and thus discharged from proximity to the glass.

The invention is applicable to the removal of oxide impurities floating on any metal bath and indeed to the removal of floating objects. It appears to operate to some extent through the surface tension of the bath and the entrapment of impurities in the tensioned surface.

As many apparently widely different embodiments of the present invention may be made without departing from the spirit and scope thereof, it is to be understood that the invention is not limited to the specific embodiments.

What is claimed is:

1. The method of removing floating impurities, especially dispersed metal oxides, from the part of a metal bath which is in proximity to a molten sheet of glass to an area of the bath remote from the glass, which comprises entraining the impurities on a moving surface immersed in the bath near the sheet of glass and conducting the impurities through the bath on the moving surface to a part of the bath remote from the glass.

2. A method of removing surface impurities in proximity to a solid in a molten metal bath which comprises in combination entraining at least part of said impurities on a moving surface immersed in the bath near the solid, conducting the impurities thus entrained through the bath on the moving surface to a position more remote from the solid, and establishing a surface current of metal which passes from the bath level of a position near the solid, beneath the surface of the bath, to the bath level of the position more remote from the solid for conducting others of said impurities to the more remote position, and entrapping the impurities there conducted in the more remote position.

3. Glass manufacturing apparatus including a tank adapted to contain molten metal and a glass sheet in contact with the metal, continuous surface means extending into the tank in proximity to a position near the glass sheet and in position to be partially submerged by the molten metal, and means to rotate the continuous surface means in a manner such that the immersed portions of the surface means move in a direction toward the edges of the bath as the non-immersed portions of the surface means move in a direction towards the side of the glass sheet, said continuous surface means being adapted to entrain thereon impurities contained in the bath which are near the glass sheet.

4. The apparatus of claim 3 in which the tank includes a wall and the continuous surface includes a predetermined number of cylinders adjacent the position of the glass sheet and adjacent the wall which, with the predetermined number of cylinders, provides a collecting bay into which the cylinders may conduct materials from the bath which are entrained thereon.

5. The apparatus of claim 4 in which each of the cylinders is, in its molten metal engaging parts, composed of graphite.

6. The apparatus of claim 4 in which the cylinders are also provided with screwlike elevations which act to move the material located between the adjacent wall and respective cylinders lengthwise of the respective cylinders towards at least one predetermined end of the respective cylinders.

7. The method for manufacturing glass sheets which comprises supporting a glass sheet in a plastic state on a bath of molten metal, and removing floating impurities, especially dispersed metal oxides, from a part of the metal bath in proximity to the glass sheet by entraining said impurities on a surface of a material which is not wetted and is not contaminated by the molten metal bath, said surface being immersed in a part of the glass near the glass sheet and actuated with a movement to cause the immersed portions of said surface to move in a direction towards the edges of the bath while the non-immersed portions move in a direction towards the interior of the bath.

References Cited by the Examiner
UNITED STATES PATENTS

| | | | |
|---|---|---|---|
| 1,810,911 | 6/1931 | Ferngren | 65—134 |
| 2,310,162 | 2/1943 | Matteson | 118—422 |
| 3,083,551 | 4/1963 | Pilkington | 65—182 |

DONALL H. SYLVESTER, *Primary Examiner.*